(12) United States Patent
Wang et al.

(10) Patent No.: US 8,708,574 B2
(45) Date of Patent: Apr. 29, 2014

(54) SAFEGUARD DEVICE FOR AN INTERFACE OF A FIBRE ADAPTER

(75) Inventors: Jerry Wang, Shanghai (CN); Liming Wang, Shanghai (CN); Peter Bos, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/520,379

(22) PCT Filed: Dec. 23, 2010

(86) PCT No.: PCT/IB2010/056052
§ 371 (c)(1),
(2), (4) Date: Jul. 3, 2012

(87) PCT Pub. No.: WO2011/080680
PCT Pub. Date: Jul. 7, 2011

(65) Prior Publication Data
US 2012/0321254 A1 Dec. 20, 2012

(30) Foreign Application Priority Data

Jan. 4, 2010 (CN) .......................... 2010 1 0001501

(51) Int. Cl.
*G02B 6/38* (2006.01)
(52) U.S. Cl.
USPC ............................................ 385/75; 385/139
(58) Field of Classification Search
USPC .................................... 385/75, 139
See application file for complete search history.

(56) References Cited

U.S. PATENT DOCUMENTS 4,273,431 A * 6/1981 Farmer et al. .................... 396/17
4,429,963 A * 2/1984 Mischenko ..................... 353/88
(Continued)

FOREIGN PATENT DOCUMENTS

DE 29720893 U1 * 1/1998
EP 0 893 718 1/1999
(Continued)

OTHER PUBLICATIONS

International Search Report and Written Opinion from International Application No. PCT/IB2010/056052 mailed May 10, 2011.

*Primary Examiner* — Charlie Peng
*Assistant Examiner* — Peter Radkowski
(74) *Attorney, Agent, or Firm* — Merchant & Gould P.C.

(57) ABSTRACT

The present invention relates to a field of optical fiber communication. A safeguard device for a fiber adapter used to connect an input optical fiber connector with an output optical fiber connector is provided. In a preferred embodiment, the safeguard device comprises a shutter and a shutter locking unit. The shutter is operably provided at an interface of said fiber adapter to allow the interface to switch between an open position and a closed position, wherein, the shutter at least shuts off the optical beam emitted from the input optical connector when in said closed position. The shutter locking unit is adapted for selectively locking the shutter in the open position or in the closed position. The safeguard device for the interface of the fiber adapter is configured to lock the shutter in the conventional fiber adapter to stably hold the interface of the fiber adapter in an open position or in a closed position, especially, to lock the shutter in the closed position to shut off the optical beam emitted from the input optical fiber connector so as to effectively prevent the emission leakage of the optical beam from the input optical fiber connector, thus avoiding potential safety hazard to the user.

16 Claims, 8 Drawing Sheets

(56) References Cited

U.S. PATENT DOCUMENTS

| | | | |
|---|---|---|---|
| 4,609,233 A * | 9/1986 | Walla | 312/219 |
| 5,687,268 A * | 11/1997 | Stephenson et al. | 385/73 |
| 6,041,155 A * | 3/2000 | Anderson et al. | 385/139 |
| 6,331,079 B1 * | 12/2001 | Grois et al. | 385/53 |
| 6,425,694 B1 * | 7/2002 | Szilagyi et al. | 385/76 |
| 6,508,593 B1 * | 1/2003 | Farnsworth et al. | 385/55 |
| 6,582,132 B1 * | 6/2003 | Farnsworth et al. | 385/53 |
| 6,996,935 B1 * | 2/2006 | Decker et al. | 49/340 |
| 2002/0181884 A1 * | 12/2002 | Fujioka et al. | 385/53 |
| 2004/0081406 A1 * | 4/2004 | Grob et al. | 385/76 |
| 2005/0003696 A1 * | 1/2005 | Shirk et al. | 439/352 |
| 2006/0037713 A1 * | 2/2006 | Ichimaru et al. | 160/37 |
| 2006/0131431 A1 * | 6/2006 | Finn | 235/492 |
| 2006/0153503 A1 * | 7/2006 | Suzuki et al. | 385/53 |
| 2006/0153504 A1 * | 7/2006 | Suzuki et al. | 385/71 |
| 2007/0036487 A1 * | 2/2007 | Grzegorzewska et al. | 385/53 |
| 2009/0074359 A1 * | 3/2009 | Case et al. | 385/53 |

FOREIGN PATENT DOCUMENTS

| | | |
|---|---|---|
| EP | 893718 A1 * | 1/1999 |
| EP | 0 919 843 | 6/1999 |
| EP | 919843 A1 * | 6/1999 |

* cited by examiner

SAFEGUARD DEVICE FOR AN INTERFACE OF A FIBRE ADAPTER

CROSS-REFERENCE TO RELATED APPLICATION

This application is a National Stage Application of PCT/IB2010/056052, filed 23 Dec. 2010, which claims benefit of Serial No. 201010001501.3, filed 4 Jan. 2010 in China and which applications are incorporated herein by reference. To the extent appropriate, a claim of priority is made to each of the above disclosed applications.

BACKGROUND OF THE INVENTION

1. Field of the Invention

The present invention relates to a field of optical fibre communication, and in particular, to a safeguard device for an interface of a fibre adapter used in the Fibre To The Home (FTTH) field.

2. Description of the Related Art

In the field of the Fibre To The Home (FTTH) technology, a protective shutter is usually provided at the interface of the fibre adapter at which an output optical fibre connector and an input optical fibre connector (that is, an optical fibre pigtail plug) are engaged. Once the input optical fibre connector inside the fibre adapter is exposed, an optical beam emitted from the input optical fibre connector may cause damage to the people, which brings potential safety hazard. The shutter is provided for avoiding such undesired leakage of the optical beam. However, the conventional shutter usually adopts a straight-push device disposed at the interface of the fibre adapter. Further, the safety concerns have not been paid much attention to when designing the conventional shutter. The conventional solution has following disadvantages: firstly, since no additional safeguard devices are provided on the protective shutter, the shutter, which is used to prevent the leakage of the optical beam, may be accidentally opened, to lead to an undesired emission of the optical beam which may cause safety hazard to human bodies. Further, no external fixing structures for reinforcing the engagement between the output optical fibre connector and the input optical fibre connector are provided for the fibre adapter. The output optical fibre connector may disengage from the input optical fibre connector accidentally. Consequently, there exists a risk of accidental disengagement between the output optical fibre connector and the input optical fibre connector.

Accordingly, it is desirable to provide a safeguard device for the conventional shutter ensuring safety of the user while diminishing the risk of accidental disengagement between the output optical fibre connector and the input optical fibre connector.

SUMMARY OF THE INVENTION

The present invention has been made to overcome or alleviate the above mentioned drawbacks or disadvantages in the art.

Accordingly, it is an object of the present invention to provide a safeguard device for a fibre adapter. The safeguard device locks the shutter to prevent unwanted opening and closing movement of the shutter, especially, the safeguard device locks the shutter in a closed position to shut off an optical beam emitted from an input optical fibre connector so as to effectively prevent the leakage of the optical beam from the input optical fibre connector, thus avoiding potential safety hazard to the user.

A further object of the present invention is to provide a safeguard device for a fibre adapter, wherein the safeguard device includes a fixing mechanism by which an output optical fibre connector which is coupled with an input optical fibre connector can be stably fixed, in order to prevent accidental separation of the output optical fibre connector from the input optical fibre connector.

A still further object of the present invention is to provide a safeguard device for a fibre adapter, which is capable of effectively fixing a fibre cable of an input optical fibre connector thereto.

According to an aspect of the present invention, there is provided a safeguard device for a fibre adapter used to connect an input optical fibre connector with an output optical fibre connector, the safeguard device comprising: a shutter, operably provided outside an interface of the fibre adapter to allow the interface to switch between an open position and a closed position, wherein, the shutter at least shuts off the optical beam emitted from the input optical connector when in the closed position; and a shutter locking unit, adapted for selectively locking the shutter in the open position or in the closed position.

Specifically, the shutter locking unit further comprises: a positioning member, adapted for positioning the shutter to the open position or the closed position; and a locking mechanism for locking and unlocking the positioning member, when the positioning member is unlocked in a released position, the shutter can be opened and closed freely; and when the positioning member is locked in a locked position, the shutter is locked in the open position or the closed position.

Further, the locking mechanism comprises a locating slot in which the positioning member is movably mounted, wherein the locating slot comprises a locating portion and a guide portion, the positioning member is movable between the guide portion and the locating portion and can be locked in the locating portion.

In an embodiment, the safeguard device further comprises an adapter holder adapted for holding the adapter in which both the shutter and the shutter locking unit are disposed.

In an embodiment, the locking mechanism further comprises a first elastic element elastically acting on the positioning member; wherein the locating slot has a substantial L-shape, the long side of the L-shape locating slot is used as the guide portion while the short side of the L-shape locating slot is used as the locating portion; wherein when the positioning member is disposed in the short side of the L-shape locating slot, the positioning member is located in the released position, and the shutter is able to be freely pivoted; and, when the positioning member moves to an end of the long side of the L-shape locating slot that is away from the short side by virtue of the elastic force of the first elastic element, the positioning member is located at the locked position, so that the pivotal movement of the shutter is restricted.

Further, the shutter locking unit further comprises: a guide mechanism adapted for guiding the positioning member from the released position to the locked position when the shutter is pivoted from the closed position to the open position, so as to lock the shutter in the open position or the closed position.

Preferably, the guide mechanism comprises: a guide member movably provided on the adapter holder; a second elastic element elastically acting on the guide member; and an actuator formed on the shutter and adapted for actuating the guide member; wherein, when the shutter is pivoted from the closed position to the open position, the actuator on the shutter drives the guide member to move against the elastic force of the second elastic element from the short side to the long side of the L-shape locating slot, then, the positioning member comes back to the end of the long side of the L-shape locating slot which is away from the short side, under the elastic force of the first elastic element, so that the positioning member is moved from the released position to the locked position so as to lock the shutter in the open position.

In an embodiment, the guide member has a wedge portion, the guide member guides the positioning member from the short side to the long side of the L-shape locating slot when the wedge portion is brought into contact with the positioning member.

Specifically, the adapter holder has a chamber in which the shutter locking unit is disposed and a cover covering the chamber, wherein the L-shape locating slot is formed on the cover; and, the positioning member has a pushing rod portion disposed in the L-shape locating slot of the cover and adapted for operating the positioning member.

In an embodiment, at least part of the locating slot has a "⌐" shape in which the two arms are used as the locating portion and the slot between the two arms are used as the guide portion, and, the positioning member has a substantially straight shape with a protruded handle thereon, the shutter is locked at the open position or the closed position when the protruded handle is moved from the guide portion to the locating portion of the locating slot.

Still further, the safeguard device further comprises a shutter pivot mechanism by which the shutter is pivotable with respect to the adapter holder, wherein the shutter pivot mechanism comprises: a pivotal axle provided on one side of the shutter; a pivotal axle hole provided on the adapter holder and the pivotal axle is disposed in the pivotal axle hole; and a third elastic element provided on the pivotal axle and elastically acting on the shutter.

Preferably, the shutter has a groove thereon against which the positioning member is movably pressed, to restrict the pivotal movement of the shutter.

In an embodiment, the safeguard device further comprises a fixing mechanism provided on the adapter holder and adapted for fixing the output optical fibre connector.

In an embodiment, the fixing mechanism further comprises: a fixing hook provided on an inside surface of the shutter distal from the pivotal axle of the shutter; and limiting ribs provided on the inside surface of the shutter and disposed at respective laterals of the output optical fibre connector.

In an embodiment, the safeguard device further comprises a fibre cable fixing mechanism provided inside the adapter holder and adapted for fixing a fibre cable inserted through the input optical fibre connector.

Specifically, the fibre cable fixing mechanism comprises a ring fixer provided in the adapter holder, and the fibre cable is tightly fixed in the ring fixer.

As apparent from the above, the present invention has at least the following advantages: the present invention provides an optical fibre connector assembly comprising a fibre adapter, an input optical fibre connector, an output optical fibre connector, and an adapter holder provided with a shutter. Especially, the present invention provides a safeguard device for an interface of the fibre adapter adopted in optical fibre connector assembly. The safeguard device for the interface of the fibre adapter is configured to lock the shutter in the conventional fibre adapter to stably hold the interface of the fibre adapter in an open position or in a closed position, especially, to lock the shutter in the closed position to shut off the optical beam emitted from the input optical fibre connector so as to effectively prevent the emission leakage of the optical beam from the input optical fibre connector, thus avoiding potential safety hazard. Further, the safeguard device according to the present invention provides a fixing mechanism for preventing disengagement between the fibre adapter and the input optical fibre connector. With the safeguard device of the present invention, the fibre cable inserted through the input optical fibre connector can be securely fixed.

BRIEF DESCRIPTION OF THE DRAWINGS

These and/or other objectives, features and advantages of the invention will become apparent and more readily appreciated from the following description of the embodiments, taken in conjunction with the accompanying drawings of which.

DETAILED DESCRIPTION OF PREFERRED EMBODIMENTS OF THE INVENTION

Exemplary embodiments of the present disclosure will be described hereinafter in detail with reference to the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 1:
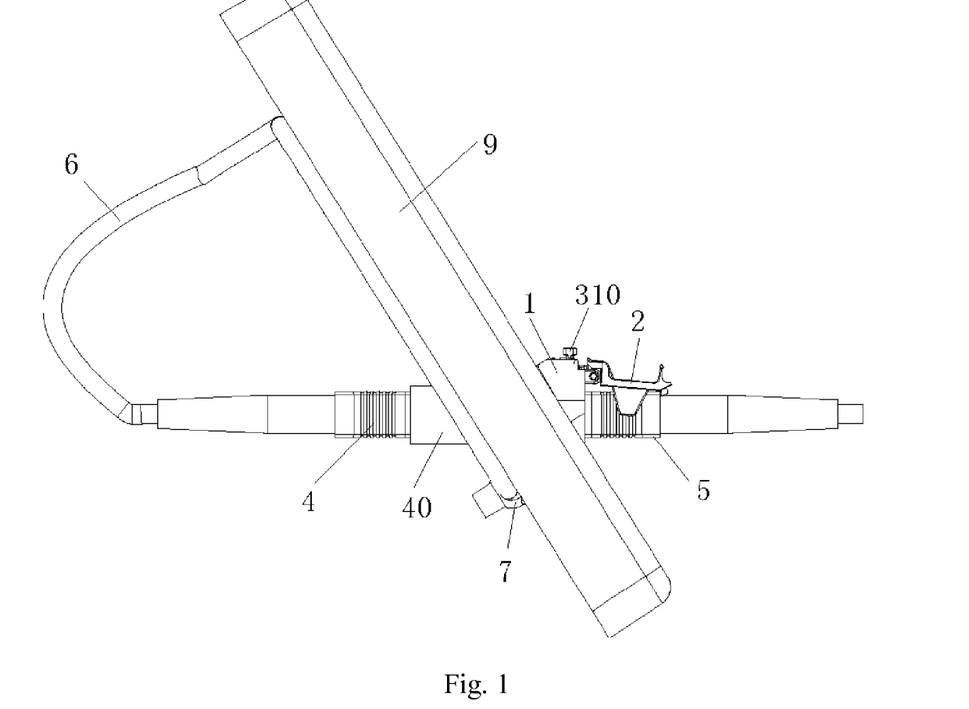
FIG. 1 is a schematic view of an optical fibre connector assembly, which is disposed onto a panel, according to one preferred embodiment of the present invention.
Figure 2:
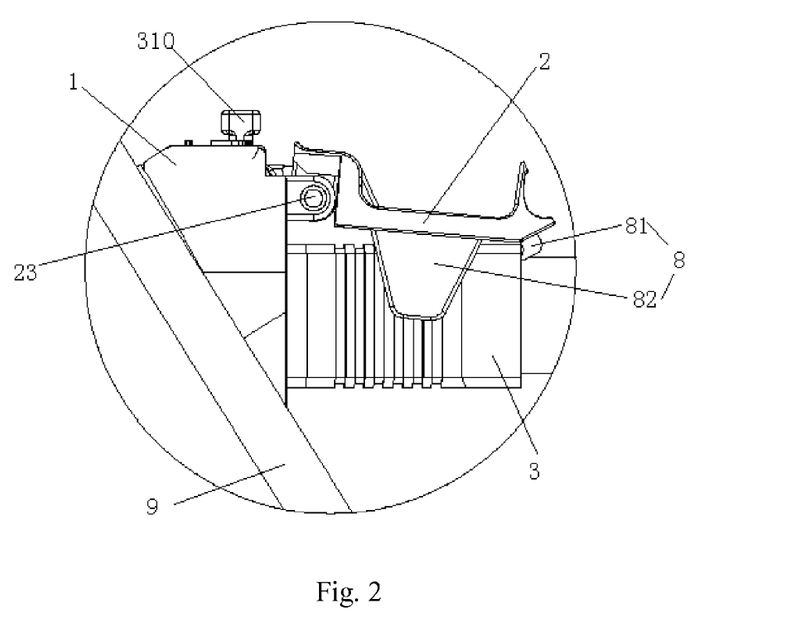
FIG. 2 is a partial enlarged drawing of FIG. 1, generally illustrating a fixing mechanism for fixing an output optical fibre connector thereon.
Figure 3:
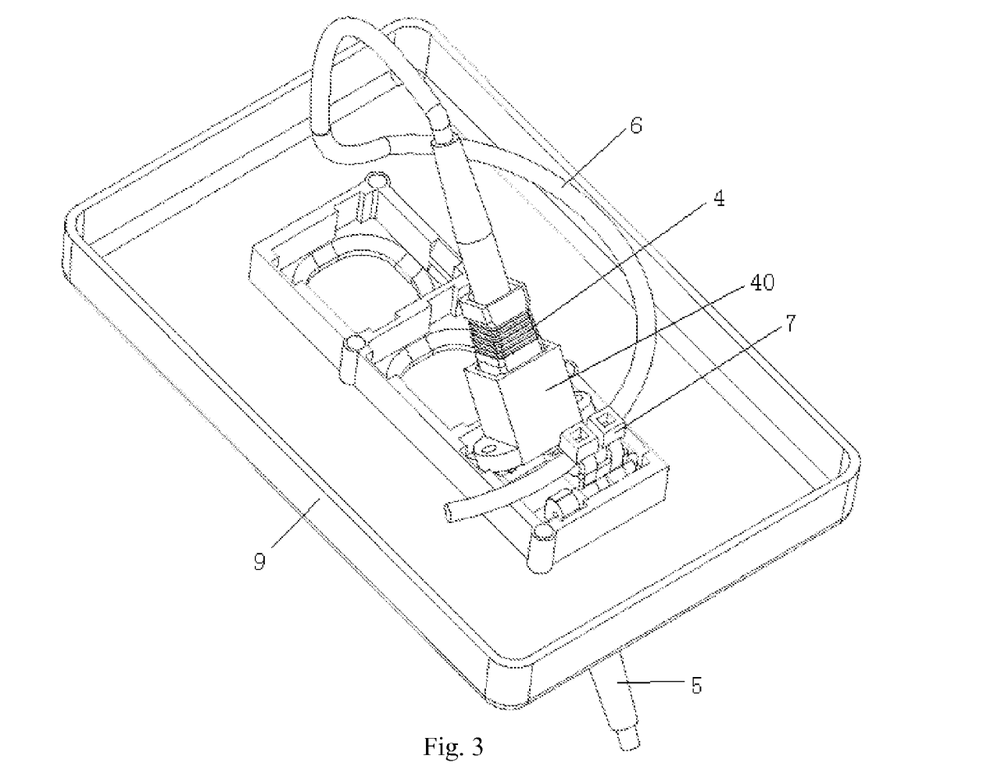
FIG. 3 is another schematic view of an optical fibre connector assembly according to one preferred embodiment of the present invention, generally illustrating the optical fibre connector assembly provided on the panel.

FIGS. 1-11 show an optical fibre connector assembly according to the present invention, in which FIGS. 1-3 show a schematic view of the optical fibre connector assembly in a specific application; FIGS. 4-8 generally show a schematic view of an adapter holder provided with a shutter in the optical fibre connector assembly according to the present invention, wherein the shutter is in an open position or in a closed position in these Figs; and, FIGS. 9-12 show an assembly relationship among the respective components of the optical fibre connector assembly.

Firstly, referring to FIGS. 1-3, the optical fibre connector assembly according to the present invention can be applied in the application of Fibre To The Home (FTTH). The optical fibre connector assembly according to the present invention is usually mounted to a panel 9 inbuilt in the indoor facilities such as the wall, to achieve a connection between an optical fibre connector inside the wall and an optical fibre connector outside the wall. As shown in FIG. 1, the optical fibre connector assembly according to the present invention mainly comprises: an input optical fibre connector 4 with an optical fibre cable 6, an output optical fibre connector 5, a fibre adapter 40 for coupling the input optical fibre connector 4 with the output optical fibre connector 5, and an adapter holder 1 with an opening 10. The fibre adapter 40 is disposed in the adapter holder 1, which is mounted on the panel 9. The output optical fibre connector 5 is inserted through the opening 10 of the adapter holder 1 into the interface of the fibre adapter 40 to achieve the connection or coupling with the input optical fibre connector 4. According to the present invention, the optical fibre connector assembly further comprises a safeguard device for the interface of the fibre adapter. Specifically, the safeguard device comprises a shutter 2 and a shutter locking unit 3. The shutter 2 is operatively provided at the interface of the fibre adapter to allow the interface switches between an open position and a closed position. The shutter 2 at least shuts off the optical beam emitted from the input optical connector 4 when it is in the closed position. When the shutter 2 is in the open position, the input optical connector 4 can be inserted into the interface of the fibre adapter. The shutter locking unit 3 is adapted for selectively locking the shutter in the open position or in the closed position. According to one preferred embodiment of the present invention, the shutter 2 is provided on the adapter holder 1 and adapted for covering the opening 10 of the fibre adapter 1 and the interface accommodated in the opening of the fibre adapter 40 (see FIG. 6). Accordingly, the shutter locking unit 3 is provided on the adapter holder 1 and adapted for selectively locking the shutter 2 in the open position or in the closed position. In another embodiment, the safeguard device may be directly provided in the fibre adapter 40. Thus, according to the present invention, in the optical fibre connector assembly, the safeguard device for the interface of the fibre adapter is adapted for locking of the shutter in the conventional fibre adapter to stably hold the interface of the fibre adapter in an open position or in a closed position, especially, to lock the shutter stably in the closed position to shut off the optical beam emitted from the input optical fibre connector so as to effectively prevent the leakage of the optical beam from the input optical fibre connector, thus avoiding potential safety hazard to the user.

According to the present invention, in the above-mentioned safeguard device, the shutter locking unit 3 comprises a positioning member 31 and a locking mechanism. Specifically, the positioning member 31 is adapted for restricting the operation of the shutter 2 by acting on the shutter 2. The locking mechanism is adapted for locking and unlocking the positioning member 31, when the positioning member is unlocked in a released position, the shutter 2 can be opened and closed freely; and when the positioning member 31 is locked in a locked position, the shutter 2 is locked in the open position or the closed position.

Figure 4:
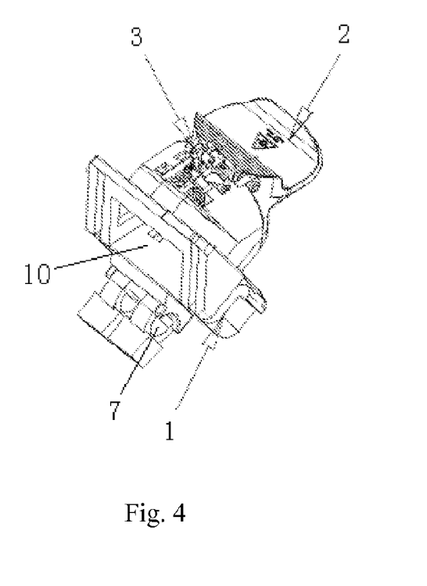
FIG. 4 is a schematic view of an adapter holder provided with a shutter in the optical fibre connector assembly according to one preferred embodiment of the present invention, in which the shutter is in an open position.
Figure 5:
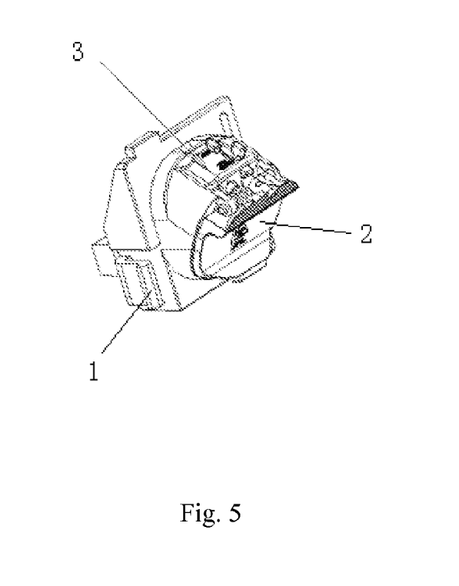
FIG. 5 is another schematic view of the adapter holder provided with the shutter in the optical fibre connector assembly according to one preferred embodiment of the present invention, in which the shutter is in a closed position.
Figure 8:
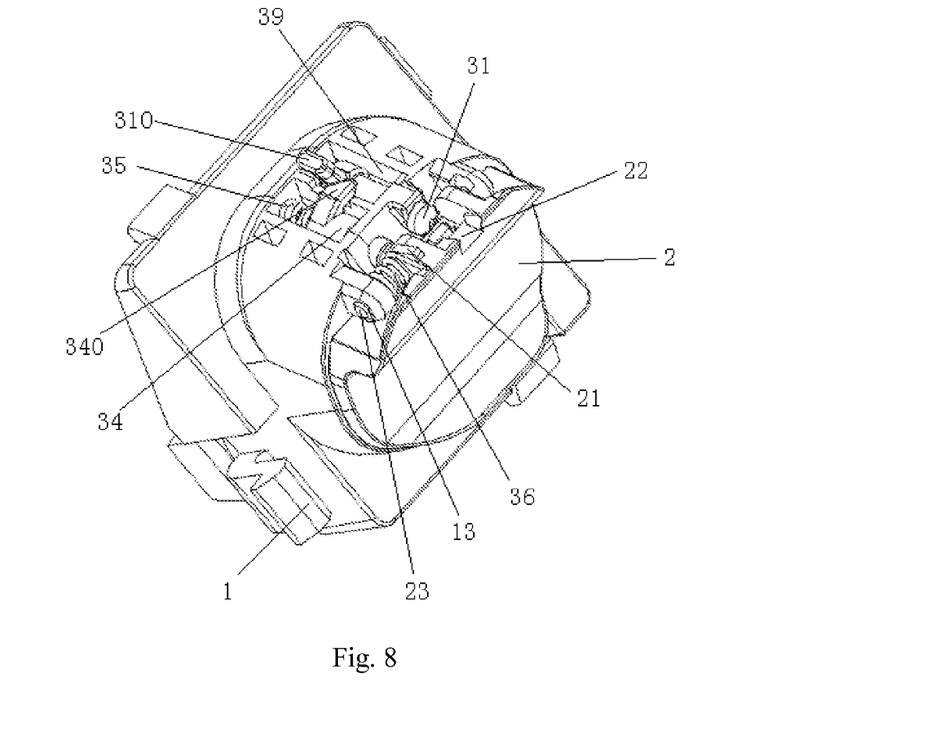
FIG. 8 is yet another structural enlarged schematic view of the adapter holder provided with the shutter in the optical fibre connector assembly according to one preferred embodiment of the present invention, in which the cover is omitted, to clearly show the interior configuration of the locking unit chamber according to the preferred embodiment.

According to one preferred embodiment of the present invention, as shown in FIG. 4 and FIG. 5, the shutter 2 is provided externally on the adapter holder 1 and is pivoted between an open position (see FIG. 4), where the opening 10 and the interface of the fibre adapter 40 are opened so as to allow insertion of the output optical fibre connector 5 and a closed position (see FIG. 5) where the opening 10 and the interface of the fibre adapter 40 are shut down. Here, FIG. 4 shows the shutter 2 that is pivoted to an open position and FIG. 5 shows the shutter 2 that is pivoted to an open position. As shown in FIG. 8, a shutter pivot mechanism is presented. The shutter pivot mechanism comprises a pivotal axle 23 provided on one side of the shutter 2, a pivotal axle hole 13 provided in the adapter holder 1 for receiving the pivotal axle 23 therein, and a third elastic element 36 provided on the pivotal axle 23 and configured to be elastically urged against the shutter 2. Preferably, the third elastic element 36 is a torsion spring. The third elastic element 36 is elastically urged against the shutter 2 when the shutter 2 is in a closed position. In order to turn the shutter 2 into an open position, the elastic force of the third elastic element 36 exerted on the shutter 2 should counteracted. In contrast, when the shutter 2 is to be brought back to the closed position from the open position, the elastic force of the third elastic element 36 will contribute the pivotal movement from the open position to the closed position. Certainly, in another preferred embodiment, the shutter 2 can take any other appropriate forms as long as it achieves closing the opening 10 of the adapter holder 1 and the interface of the fibre adapter 40, and vice versa. For example, the shutter 2 may adopt a displacement movement instead of a pivotal movement to achieve the opening and closing the opening 10 of the adapter holder 1 and the interface of the fibre adapter 40.

According to the present invention, the shutter locking unit 3 in the safeguard device is generally provided in the adapter holder 1 and adapted for selectively locking the shutter 2 in an open position or in a closed position. Particularly, the shutter locking unit 3 comprises a positioning member 31 and a locking mechanism. Specifically, the positioning member 31 is adapted for restricting the operation of the shutter 2 by acting on the shutter 2. The locking mechanism is adapted for locking and unlocking the positioning member 31, when the positioning member is unlocked in a released position, the shutter 2 can be opened and closed freely; and when the positioning member 31 is locked in a locked position, the shutter 2 is locked in the open position or the closed position.

Particularly, in the preferred embodiment in which the shutter 2 is pivotably mounted on the adapter holder 1, when the positioning member 31 is located at the released position, the shutter 2 may be freely pivoted between the open position and the closed position; when the positioning member 31 is located at the locked position, the pivotal movement of the shutter 2 is be restricted by the positioning member 31, accordingly, the shutter 2 is locked in the open position or the closed position.

According to the present invention, the locking mechanism is preferably configured to b a locating slot. The positioning member 31 is movably mounted in the locating slot. The locating slot comprises a locating portion and a guide portion. The positioning member 31 is movable between the guide portion and the locating portion and can be locked in the locating portion.

In the present invention, the construction of the positioning member 31 and the locking mechanism in the locking unit 3 is not limited to the above exemplary embodiment, and can be varied in forms and configurations as long as positioning member 31 can be switched between a released position and a the locked position.

Figure 6:
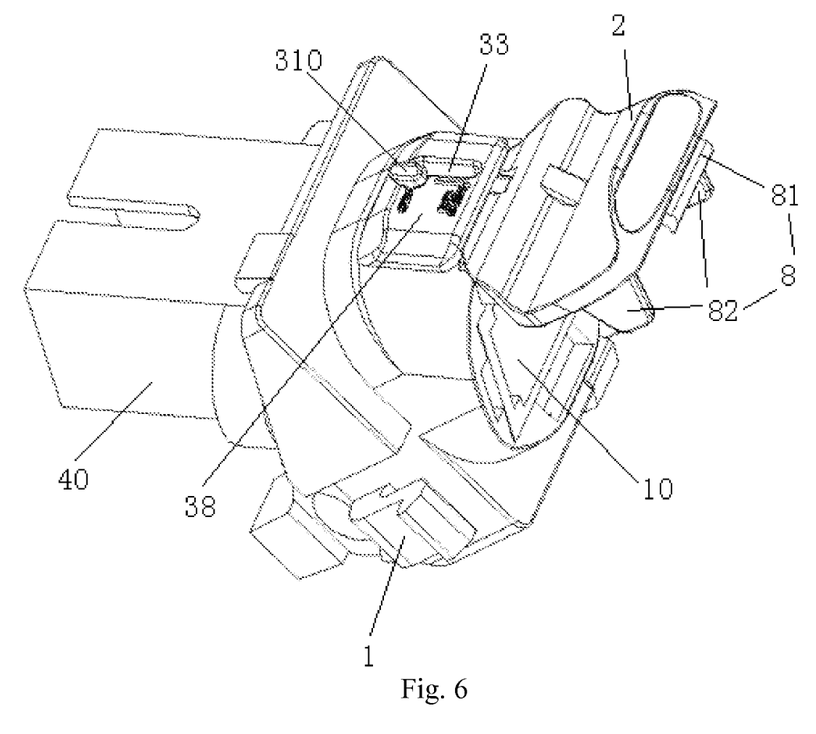
FIG. 6 is a structural enlarged schematic view of the adapter holder provided with the shutter in the optical fibre connector assembly according to one preferred embodiment of the present invention, in which the adapter holder is provided with an optical fibre adapter therein.
Figure 7:
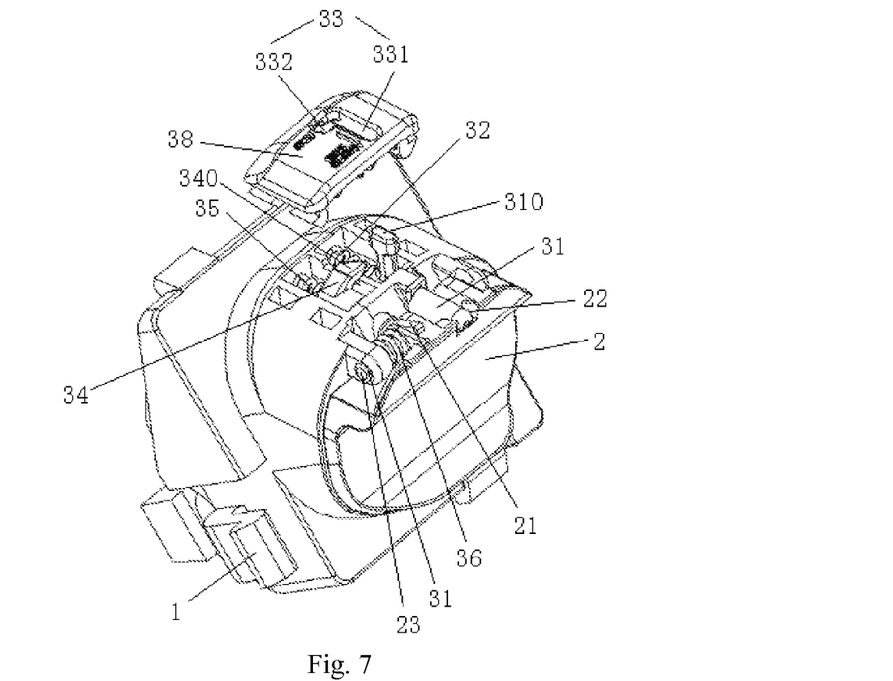
FIG. 7 is another structural enlarged schematic view of the adapter holder provided with the shutter in the optical fibre connector assembly according to one preferred embodiment of the present invention, in which a cover is separated from a locking unit chamber, to clearly show the configuration of the shutter locking unit according to the preferred embodiment.

Preferably, according to one preferred embodiment of the present invention, as shown in FIGS. 6-8, a preferred design of the positioning member 31 and the locking mechanism in the locking unit 3 is provided. Particularly, referring to FIG. 7, the locking mechanism comprises a first elastic element 32 which exerts an elastic force on the positioning member 31 and a substantially L-shape locating slot 33 adapted for restricting the movement of the positioning member 31. The long side 331 of the L-shape locating slot 33 is used as the guide portion while the short side 332 of the L-shape locating slot 33 is used as the locating portion.

When being pushed into the short side 332 of the L-shape locating slot 33 against the elastic force of the first elastic element 32, the positioning member 31 is located in the released position, and, the shutter 2 is allowed to be freely pivoted. When the positioning member 31 moves to an end of the long side 331 of the L-shape locating slot 33 which is away from the short side 332 by virtue of the elastic force of the first elastic element 32, the positioning member 31 is brought into the locked position, so that the opening and closing of the shutter 2 is restricted.

Specifically, as shown in FIGS. 6-8, the adapter holder 1 has a locking unit chamber 39 in which the shutter locking unit 3 is disposed and a cover 38 covering the locking unit chamber 39. The L-shape locating slot 33 is formed on the cover 38; and, the positioning member 31 and the first elastic element 32 are provided in the locking unit chamber 39. In the preferred embodiment, the positioning member 31 is configured to be a pin-shaped positioning member with a pushing rod portion 310 protruded from the lateral thereof. In the preferred embodiment, the pushing rod portion 310 is disposed in the L-shape locating slot 33 of the cover 38. The movement of the positioning member 31 may be carried out by the manipulation of the pushing rod portion 310, while the location of the positioning member 31 is achieved by engagement between the L-shape locating slot 33 of the cover 38 and the pushing rod portion 310. When the pushing rod portion 310 is restricted at the end of the long side 331 of the L-shape locating slot 33 distal from the short side 332, the positioning member 31 is located in the locked position by counteracting the elastic effects of the first elastic element 32. When the pushing rod portion 310 is restricted at the short side 332 of the L-shape locating slot 33, the positioning member 31 is located in the released position by counteracting the elastic effects of the first elastic element 32. Particularly, as shown in FIG. 7, when the positioning member 31 is located in the locked position, the one end of the positioning member 31 extends out of the locking unit chamber 39 of the adapter holder 1 and intervenes the pivotal movement of the shutter 2, so as to lock the shutter 2 in the open position or in the closed position. In contrast, referring to FIG. 8, when the positioning member 31 is located in the released position, the one end of the positioning member 31 retracts into the locking unit chamber 39 of the adapter holder 1 and the intervention on the pivotal movement of the shutter 2 is removed so as to release the locking of the shutter 2, as a result, the shutter 2 can be freely pivoted between the open position and the closed position. Furthermore, the shutter 2 is preferably formed with a groove 22, and the positioning member 31 can be brought to move into the groove 22, so as to restrict the pivotal movement of the shutter 2. As long as the location and the movement of the positioning member 31 is achieved by the engagement between the L-shape locating slot 33 and the pushing rod portion 310, the positioning member 31 and its pushing rod portion 310 may also be two independent elements in alternative embodiments. Preferably, the first elastic element 32 is a coil spring.

During usage of the safeguard device, the operator may push the pushing rod portion 310 into the short side 332 of the L-shape locating slot 33, i.e., to locate the positioning member 31 in the released position, so as to release locking of the shutter 2. On the other hand, in order to return the positioning member 31 from the released position to the locked position when the shutter 2 is pivoted from the closed position to the open position in an automatic way, the locking unit according to the present invention further comprises a guide mechanism adapted for guiding the positioning member 31 from the released position to the locked position, so as to lock the shutter 2 in the open position or the closed position. Particularly, as shown in FIGS. 6-8, the guide mechanism comprises a movable guide member 34 provided on the adapter holder 1, a second elastic element 35 exerts an elastic force on the guide member 34, and an actuator 21 formed on the shutter 2 and adapted for actuating the guiding of the guide member 34. When the shutter 2 is pivoted from the closed position to the open position, the actuator 21 formed on the shutter 2 drives the guide member 34 to move against the elastic force of the second elastic element 35 while the guide member 34 guides the positioning member 31 from the short side 332 to the long side 331 of the L-shape locating slot 33, then, the positioning member 31 comes back to the end of the long side 331 of the L-shape locating slot 33 which is away from the short side 332, by virtue of the elastic effects of the first elastic element 32, so that the positioning member 31 is moved from the released position to the locked position so as to lock the shutter 2 in the open position.

According to one preferred embodiment of the present invention, the guide member 34 has a wedge portion 340, the guide member 34 guides the positioning member 31 from the short side 332 to the long side 331 of the L-shape locating slot 33 when the wedge portion 340 is brought into contact with the positioning member 31. In this preferred embodiment, the guide member 34 is configured to be a pin-shaped member with the wedge portion 340, and, the wedge portion 340 is protruded from the lateral of the guide member 34. Thus, the restriction of the short side 332 of the L-shape locating slot 33 to the pushing rod portion 310 of the positioning member 31 can be removed to allow the positioning member 31 to come back to the long side 331 of the L-shape locating slot 33, and under the elastic force of the first elastic element 32, the positioning member 31 itself may automatically move from the released position to the locked position to lock the shutter 2 in the closed position or in the open position. That is, the positioning member 31 can move from the released position to the locked position by itself by the guiding of the guide mechanism and the elastic force of the first elastic element 32, without any external manual manipulation.

Figure 13:
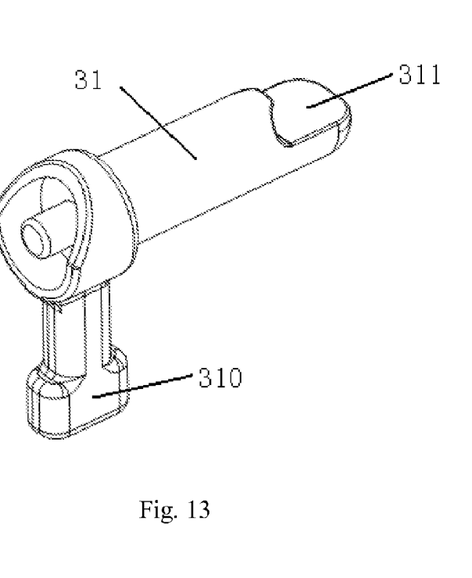
FIG. 13 is a schematic view of a positioning member according to one preferred embodiment of the present invention.
Figure 14:
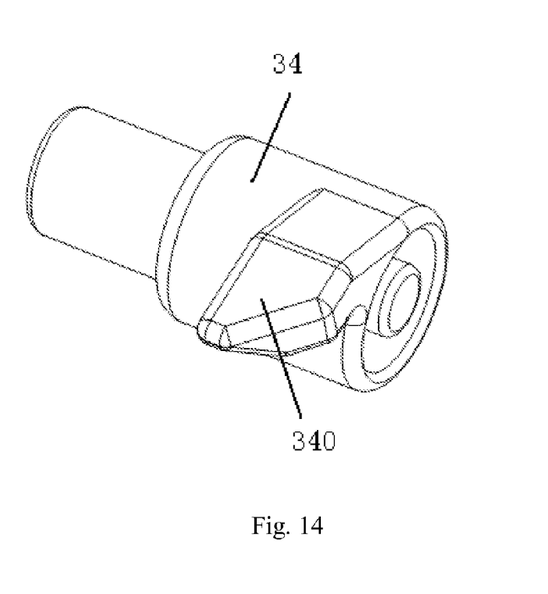
FIG. 14 is a schematic view of a guide member according to one preferred embodiment of the present invention.

FIG. 13 shows a schematic view of the positioning member 31 according to one preferred embodiment of the present invention, i.e., the preferred embodiment in which the positioning member 31 is pivotably mounted on the adapter holder 1. The positioning member 31 has a pin-shaped body portion and a pushing rod portion 310 protruded from the lateral thereof. Furthermore, the positioning member 31 further has a positioning surface 311 which is to be engaged with the groove 22 of the shutter 2 so as to restrict the operation of the shutter 2. FIG. 14 shows a schematic view of the guide member 34 according to one preferred embodiment of the present invention, in which the guide member 34 has a body portion and a wedge portion 340 protruded from the lateral thereof.

Figure 15:
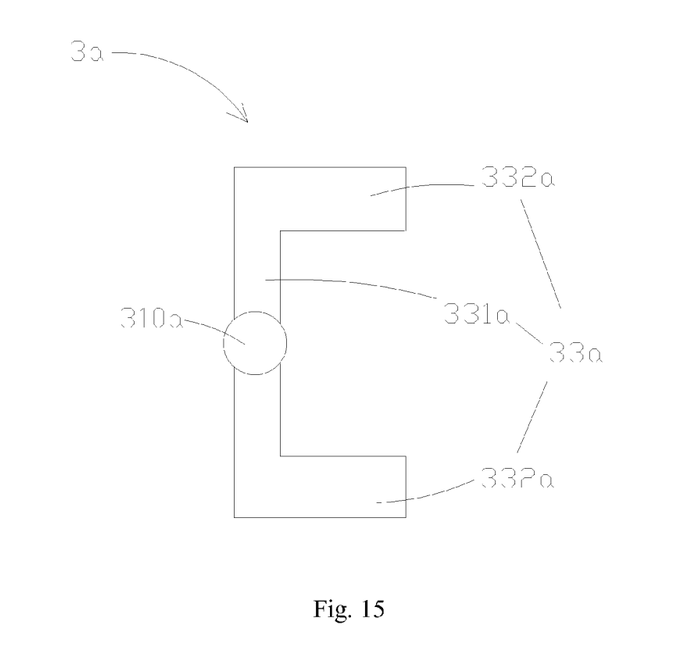
FIG. 15 is a simply schematic view of an engagement between a locating slot and a positioning member according to another preferred embodiment of the present invention.

According to the present invention, alternatively, the locking structure of the locking unit 3 and the positioning member 31 may adopt other various forms, for example, FIG. 15 is a simplified schematic view of an engagement between a locating slot and a positioning member according to another preferred embodiment of the present invention. Specifically, the locating slot 3a at least has a "⊏" structure 33a in which the two cross arms 332a are illustrated as the locating portion 332a and the upright arm 331a are illustrated as the guide portion 331a, and, the positioning member 31a (no shown) has a substantially straight shape with a protruded handle 310a thereon, the shutter 2 is locked at the open position or the closed position when the protruded handle 310a is moved from the guide portion 331a to the locating portion 332a of the locating slot 33a. Thus, in the preferred embodiment of FIG. 15, the switching operation of the positioning member 31a between the locking position and the released position should be manually carried out instead of being implemented in an automatic way. Also, the locking unit is not limited to the above examples, but can take any other suitable forms and variations as long as the positioning member 31 can be locked in the locking position and the released position by means of the locking mechanism, respectively.

Figure 9:
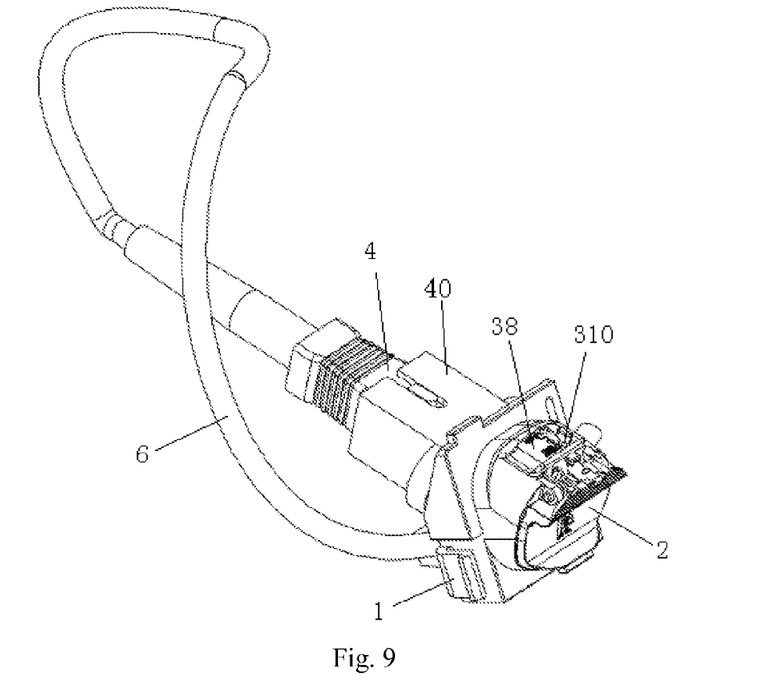
FIG. 9 is an assembled schematic view of the optical fibre connector assembly, i.e., an input optical fibre, a fibre adapter, and an adapter holder provided with a shutter according to one preferred embodiment of the present invention, in which the shutter is in a closed position.
Figure 10:
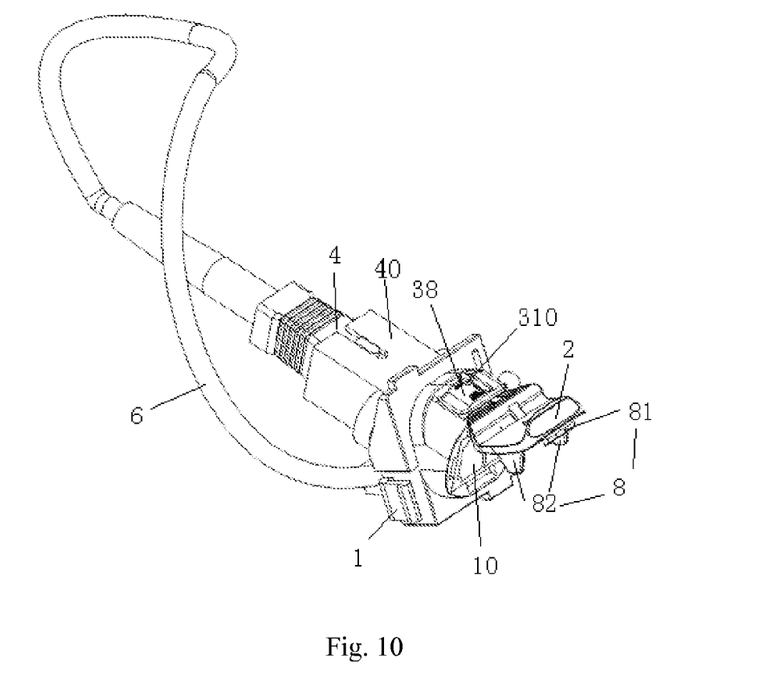
FIG. 10 is another assembled schematic view of the optical fibre connector assembly, i.e., an input optical fibre, a fibre adapter, and an adapter holder provided with a shutter according to one preferred embodiment of the present invention, in which the shutter is in an open position.
Figure 11:
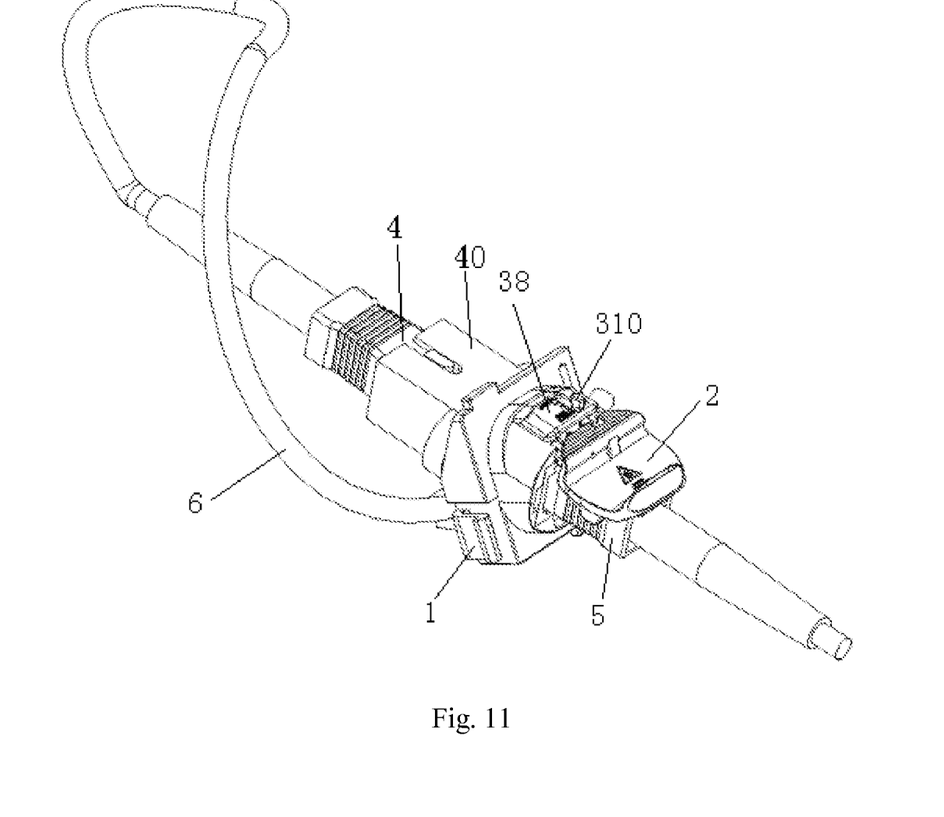
FIG. 11 is a schematic view of the optical fibre connector assembly according to one preferred embodiment of the present invention.
Figure 12:
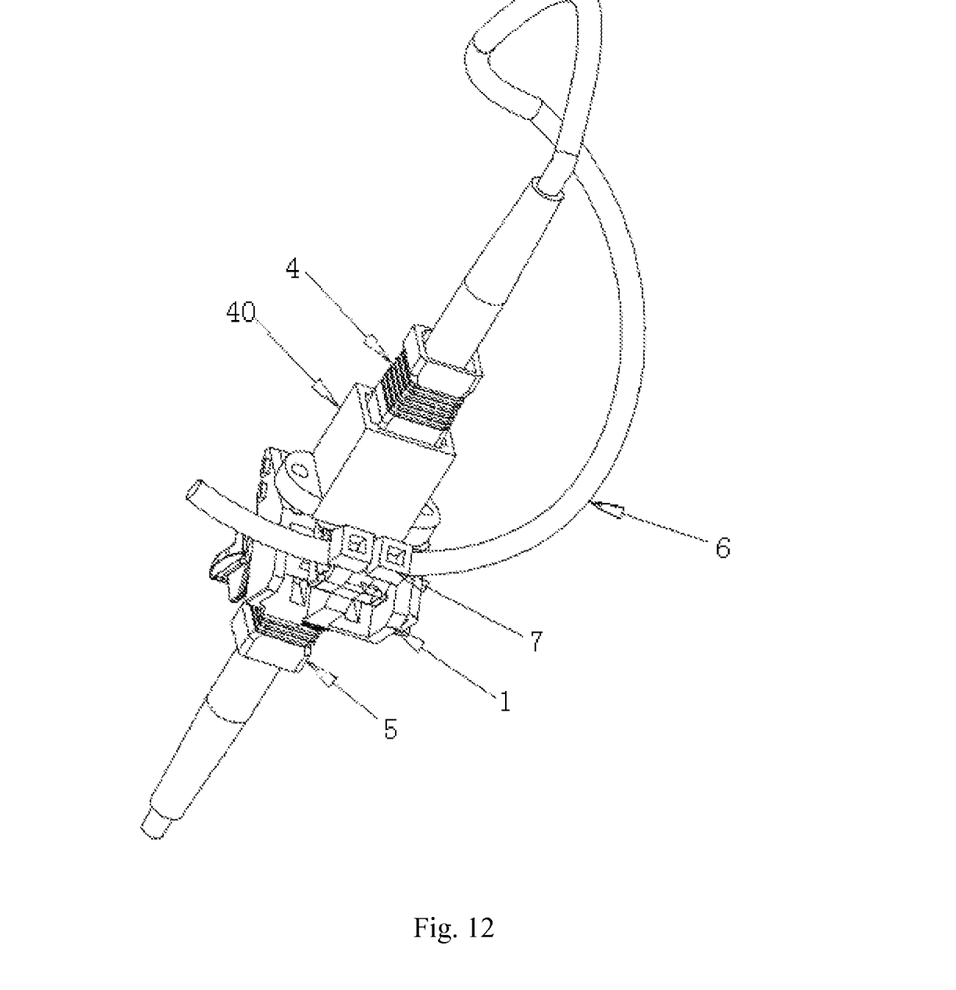
FIG. 12 is another schematic view of the optical fibre connector assembly according to one preferred embodiment of the present invention.

Particularly, FIG. 9 shows an assembled schematic view of the optical fibre connector assembly in which the input optical fibre connector 4, the fibre adapter 40, and the adapter holder 1 having the shutter 2 are assembled together, in which the shutter 2 is in a closed position. FIG. 10 shows another assembled schematic view of the optical fibre connector assembly in which the input optical fibre connector 4, the fibre adapter 40, and the adapter holder 1 having the shutter 2 are assembled together in which the shutter 2 is in an open position. FIG. 11 shows a schematic view of the optical fibre connector assembly according to one preferred embodiment of the present invention, in which the input optical fibre connector 4, the fibre adapter 40, the output optical fibre 5, and the adapter holder 1 having the shutter 2 are assembled together. FIG. 12 shows another schematic view of the optical fibre connector assembly according to one preferred embodiment of the present invention, in which the input optical fibre connector 4, the fibre adapter 40, the output optical fibre 5, and the adapter holder 1 provided with the shutter 2 are assembled together.

In the above-mentioned safeguard device for the interface of the fibre adapter, the shutter locking unit may lock the shutter in a closed position or in an open position in a convenient manner. The safeguard device for the interface of the fibre adapter according to the present invention achieves locking of the shutter in the conventional fibre adapter to stably hold the interface of the fibre adapter in an open position or in a closed position, especially, to lock the shutter in the closed position to shut off the optical beam emitted from the input optical fibre connector so as to effectively prevent the leakage of the optical beam from the input optical fibre connector, thus avoiding potential safety hazard to the user.

According to the present invention, the optical fibre connector assembly further comprises a fixing mechanism 8 provided on the adapter holder 1 and adapted for fixing the output optical fibre connector 5 thereon. The fixing mechanism 8 is provided on the adapter holder 1 and adapted for fixing the output optical fibre connector 5 of the fibre adapter 40. According to the preferred embodiment, as shown in FIG. 2, the fixing mechanism 8 comprises a fixing hook 81 and limiting ribs 82. The fixing hook 81 is provided at an inside surface of the shutter 2 facing the opening 10 and is located away from the pivotal axle 23 of the shutter 2, in order to prevent the output optical fibre connector 5 from disengaging from the opening 10. A pair of limiting ribs 82 is respectively provided at the inside surface of the shutter 2 facing the opening 10 and are located at both laterals of the output optical fibre connector 5, in order to prevent displacement and loosing of the connection of the output optical fibre connector 5. Therefore, the safeguard device for the interface of the fibre adapter according to the present invention adopts the fixing mechanism, on which the output optical fibre connector is fixed, so as to achieve the affixing of the input and output optical fibre connectors 4, 5.

In addition, the safeguard device for the interface of the fibre adapter according to the present invention further comprises a fibre cable fixing mechanism 7. As shown in FIG. 12, the fibre cable fixing mechanism 7 is provided inside the adapter holder 1 and adapted for fixing a fibre cable 6 which is coupled with the fibre adapter 40. According to one preferred embodiment of the present invention, the fibre cable fixing mechanism 7 is configured to be a ring fixer 7 disposed on the adapter holder 1, and the fibre cable 6 coupled with the input optical fibre 40 is fixed in the ring fixer 7.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

The invention claimed is:

1. A safeguard device for a fibre adapter used to connect an input optical fibre connector with an output optical fibre connector, the safeguard device comprising:
   a shutter operably provided outside an interface of said fibre adapter, the shutter being configured to switch between an open position and a closed position, wherein the shutter at least shuts off the optical beam emitted from the input optical connector when in said closed position; and
   a shutter locking unit coupled to the shutter, the shutter locking unit having a locked state and a released state, the shutter locking unit adapted for locking the shutter in the open position or in the closed position when the shutter locking unit is in said locked state, and the shutter locking unit configured to switch between the locked and released states independent of movement of the shutter.

2. The safeguard device as claimed in claim 1, wherein the shutter locking unit comprises:
   a positioning member adapted for restricting operation of the shutter by acting on the shutter, the positioning member movable between a locked position and a released position, the shutter locking unit being configured in the locked state when the positioning member is disposed in the locked position and the shutter locking unit being configured in the released state when the positioning member is disposed in the released position; and a locking mechanism by which the positioning member is moved between the locked and released position.

3. The safeguard device as claimed in claim 2, wherein the locking mechanism comprises a locating slot into which said positioning member is movably mounted, wherein said locating slot comprises a locating portion and a guide portion, the positioning member is movable between the guide portion and the locating portion.

4. The safeguard device as claimed in claim 3, further comprising:

an adapter holder adapted for holding said adapter in which both the shutter and the shutter locking unit are disposed.

5. The safeguard device as claimed in claim 3, wherein said locking mechanism further comprises a first elastic element exerting elastic force on said positioning member;

wherein said locating slot has a substantial L-shape, the long side of the L-shape locating slot is used as the guide portion while the short side of the L-shape locating slot is used as the locating portion; wherein when said positioning member is disposed in said short side of the L-shape locating slot, said positioning member is located in said released position, and the shutter is allowed to be freely pivoted; and when the positioning member moves to an end of the long side of said L-shape locating slot that is away from said short side by virtue of the elastic force of the first elastic element, said positioning member is located at said locked position, so that the pivotal movement of the shutter is restricted.

6. The safeguard device as claimed in claim 5, wherein said shutter locking unit further comprises:

a guide mechanism adapted for guiding said positioning member from said released position to said locked position when said shutter is pivoted to said closed position so as to lock said shutter in said closed position and adapted for guiding said positioning member from said released position to said locked position when said shutter is pivoted to said open position so as to lock said shutter in said open position.

7. The safeguard device as claimed in claim 6, wherein said guide mechanism comprises:

a guide member movably provided on said adapter holder;
a second elastic element exerting elastic force on said guide member; and
an actuator formed on said shutter for actuating said guide member;

wherein, when the shutter is pivoted from said closed position to said open position, said actuator on said shutter drives said guide member to move against the elastic force of said second elastic element to guide the positioning member from said short side to said long side of said L-shape locating slot, wherein said positioning member comes back to the end of the long side of said L-shape locating slot, which is away from said short side, under the elastic force of the first elastic element, so that the positioning member is moved from said released position to said locked position so as to lock said shutter in said open position.

8. The safeguard device as claimed in claim 7, wherein said guide member has a wedge portion, said guide member guides said positioning member from said short side to said long side of said L-shape locating slot when said wedge portion is brought into contact with said positioning member.

9. The safeguard device as claimed in claim 8, wherein said adapter holder has a chamber in which said shutter locking unit is disposed and a cover covering said chamber, wherein said L-shape locating slot is formed on said cover; and said positioning member has a pushing rod portion disposed in said L-shape locating slot of said cover and adapted for operating said positioning member.

10. The safeguard device as claimed in claim 3, wherein at least part of said locating slot has a "⊏" shape in which two arms of the "⊏" shape are used as said locating portion and a slot between the two arms is used as said guide portion, and said positioning member having a substantially straight-line shape with a protruded handle thereon, wherein said shutter is locked at said open position or said closed position when said protruded handle is moved from said guide portion to said locating portion of said locating slot.

11. The safeguard device as claimed in claim 4, further comprising a shutter pivot mechanism by which said shutter is pivotable with respect to said adapter holder, wherein said shutter pivot mechanism comprises:

a pivotal axle provided on one side of said shutter;
a pivotal axle hole provided in said adapter holder and said pivotal axle is disposed in the pivotal axle hole; and
a third elastic element provided on said pivotal axle and exerting elastic force on said shutter.

12. The safeguard device as claimed in claim 11, wherein said shutter has a groove thereon against which said positioning member is movably pressed to restrict the pivotal movement of said shutter.

13. The safeguard device as claimed in claim 1, further comprising:

a fixing mechanism provided on said adapter holder and adapted for fixing said output optical fibre connector.

14. The safeguard device as claimed in claim 13, wherein said fixing mechanism further comprises:

a fixing hook provided on an inside surface of the shutter distal from a pivotal axle of the shutter; and
limiting ribs provided on said inside surface of said shutter and disposed at respective laterals of said output optical fibre connector.

15. The safeguard device as claimed in claim 1, further comprising a fibre cable fixing mechanism provided inside said adapter holder and adapted for fixing a fibre cable inserted through said input optical fibre connector.

16. The safeguard device as claimed in claim 15, wherein said fibre cable fixing mechanism comprises a ring fixer provided in said adapter holder, and the fibre cable is tightly fixed in the ring fixer.

* * * * *